United States Patent
Helms et al.

(10) Patent No.: US 7,900,466 B2
(45) Date of Patent: Mar. 8, 2011

(54) AIR-CONDITIONING SYSTEM FOR A MOTOR VEHICLE

(75) Inventors: Karsten Helms, Wasbuettel (DE); Peter Hellmann, Cremlingen (DE)

(73) Assignee: Volkswagen AG, Wolfsburg (DE)

( * ) Notice: Subject to any disclaimer, the term of this patent is extended or adjusted under 35 U.S.C. 154(b) by 759 days.

(21) Appl. No.: 11/791,873

(22) PCT Filed: Sep. 29, 2005

(86) PCT No.: PCT/EP2005/010530
§ 371 (c)(1),
(2), (4) Date: Dec. 7, 2007

(87) PCT Pub. No.: WO2006/056260
PCT Pub. Date: Jun. 1, 2006

(65) Prior Publication Data
US 2008/0209929 A1 Sep. 4, 2008

(30) Foreign Application Priority Data
Nov. 26, 2004 (DE) .......... 10 2004 057 159

(51) Int. Cl.
*F25B 1/00* (2006.01)
(52) U.S. Cl. ................................. 62/228.3
(58) Field of Classification Search .......... 62/130, 62/133, 208, 209, 228.1, 228.3, 228.4, 228.5, 62/229, 243, 323.1, 323.4; 417/44.1, 44.2, 417/212, 218–222.2
See application file for complete search history.

(56) References Cited

U.S. PATENT DOCUMENTS

| 5,924,296 | A | 7/1999 | Takano et al. |
| 6,192,700 | B1 | 2/2001 | Runk et al. |
| 6,434,956 | B1 * | 8/2002 | Ota et al. .................. 62/133 |
| 6,484,520 | B2 * | 11/2002 | Kawaguchi et al. ........... 62/133 |
| 6,615,595 | B2 * | 9/2003 | Baruschke et al. ............ 62/133 |
| 6,910,344 | B2 * | 6/2005 | Matsubara et al. ........... 62/228.3 |
| 7,263,877 | B2 * | 9/2007 | Schaefer et al. ........... 73/114.01 |
| 7,676,331 | B2 * | 3/2010 | Sawada et al. ................. 702/41 |
| 2001/0007194 | A1 * | 7/2001 | Kimura et al. ............ 62/228.3 |
| 2001/0017036 | A1 * | 8/2001 | Kawaguchi et al. ........... 62/133 |
| 2002/0069656 | A1 | 6/2002 | Niimi |
| 2002/0100285 | A1 | 8/2002 | Baruschke et al. |

(Continued)

FOREIGN PATENT DOCUMENTS

DE 198 41 765 4/1999

(Continued)

OTHER PUBLICATIONS

International Search Report, PCT International Patent Application No. PCT/EP2005/010530, dated Dec. 28, 2005.

(Continued)

*Primary Examiner* — George Nguyen
(74) *Attorney, Agent, or Firm* — Kenyon & Kenyon LLP

(57) ABSTRACT

An air-conditioning system for a motor vehicle includes a coolant circuit, through which it is possible to pump coolant with the aid of a compressor, the air-conditioning system having a torque-determining unit for determining a drive torque required for operating the compressor as a function of a temperature of air, which has flowed past an evaporator integrated into the coolant circuit for evaporating coolant, a pressure of the coolant prevailing in the coolant circuit in front of the compressor relative to a flow direction of the coolant or an actuating signal for setting a settable compressor stroke of the compressor.

10 Claims, 2 Drawing Sheets

U.S. PATENT DOCUMENTS

| | | |
|---|---|---|
| 2002/0184899 A1 | 12/2002 | Togaru et al. |
| 2003/0084674 A1 | 5/2003 | Kawaguchi et al. |
| 2004/0003603 A1* | 1/2004 | Saeki et al. .................... 62/133 |
| 2006/0080977 A1* | 4/2006 | Noda .............................. 62/129 |
| 2006/0204368 A1* | 9/2006 | Imai et al. .................... 417/212 |

FOREIGN PATENT DOCUMENTS

| | | |
|---|---|---|
| DE | 100 53 426 | 5/2001 |
| DE | 101 26 524 | 5/2002 |
| DE | 101 06 243 | 8/2002 |
| DE | 103 01 819 | 7/2004 |
| DE | 699 15 963 | 8/2004 |
| DE | 103 12 556 | 10/2004 |
| EP | 1 304 479 | 4/2003 |

OTHER PUBLICATIONS

Written Opinion of the International Searching Authority, PCT International Patent Application No. PCT/EP2005/010530, dated Dec. 28, 2005 (translation of supplemental pages provided).

Search Report, German Patent Application No. 10 2004 057 159.7, Sep. 2, 2005.

*Kraftfahrtechnisches Taschenbuch*, 23$^{rd}$ Edition, 1999, pp. 778-779.

\* cited by examiner

AIR-CONDITIONING SYSTEM FOR A MOTOR VEHICLE

FIELD OF THE INVENTION

The present invention relates to an air-conditioning system for a motor vehicle having a coolant circuit, through which coolant may be pumped with the aid of a compressor.

BACKGROUND INFORMATION

Such an air-conditioning system is described, e.g., in the book Bosch, Kraftfahrtechnisches Taschenbuch ("Automotive Handbook"), $23^{rd}$ Edition, Vieweg, 1999, ISBN 3-528-03876-4, pages 778 and 779. Accordingly, it is provided in such air-conditioning systems to use automatic controls having a program selection for automatically setting a desired interior temperature, air quantity and air distribution. These variables are said to be always tied to one another and not freely modifiable. A provided electronic control-unit is said to measure both all important influencing and interfering variables as well as the temperature selected by the occupants and to form from this continuously a temperature setpoint value. The temperature setpoint is said to be compared to the actual temperature and the ascertained difference is said to generate reference variables for controlling the heating, cooling and air quantity. Another function is said to activate the clack valve control system for the air distribution—as a function of the program set by occupants. It is said to be possible to influence all control loops by manual input. The temperature setpoint ascertained by the control system is said to be achieved by water or air control. It is said to be possible to bring the air quantity to the setpoint value by setting various blower steps or in a stepless manner. Generally, this is said to be a control system without actual value processing. At high speeds, this device is said to be insufficient because the ram pressure occurring in that case is said to increase the output volume. With increasing driving speed, a special control system is said to be able first to reduce the blower speed until it comes to a standstill and, if the ram pressure continues to rise, to limit the entering air flow via a throttle valve.

SUMMARY

Example embodiments of the present invention may improve the operation of a motor vehicle having an air-conditioning system.

According to example embodiments of the present invention, an air-conditioning system for a motor vehicle includes a coolant circuit, through which it is possible to pump coolant with the aid of a compressor, the air-conditioning system having a torque-determining unit for determining a drive torque required for operating the compressor as a function of a temperature of air, which has flowed past an evaporator integrated into the coolant circuit for evaporating coolant, a pressure of the coolant prevailing in the coolant circuit, e.g., directly, in front of the compressor relative to a flow direction of the coolant and/or an actuating signal for setting a settable compressor stroke of the compressor.

A pressure prevailing in the coolant circuit in front of the compressor relative to a flow direction of the coolant may be a pressure prevailing in the coolant circuit between an evaporator and the compressor. A temperature of air, which has flowed past an evaporator integrated into the coolant circuit for evaporating coolant, may be air that has flowed through a system of cooling vanes of the evaporator. A drive torque required for operating a compressor may be the torque that must be generated in order to operate the compressor at a desired speed or an actual speed.

The actuating signal may be an electrical current.

The coolant may be R134a, R152a or carbon dioxide.

Using the torque-determining unit, it may be possible to determine the drive torque required for operating the compressor as a function of a coolant pressure prevailing in the coolant circuit behind the compressor relative to the flow direction of the coolant.

A pressure prevailing in the coolant circuit behind the compressor relative to a flow direction of the coolant may be a pressure prevailing in the coolant circuit between the compressor and the evaporator, e.g., between the compressor and a valve situated in front of the evaporator.

It may be possible to determine, with the aid of the torque-determining unit, the drive torque required for operating the compressor as a function of a drive speed of the compressor.

According to example embodiments of the present invention, a motor vehicle includes an air-conditioning system, which has a coolant circuit, through which it is possible to pump coolant with the aid of a compressor, and a torque-determining unit for determining a drive torque required for operating the compressor as a function of a temperature of air, which has flowed past an evaporator integrated into the coolant circuit for evaporating coolant, a pressure of the coolant prevailing in the coolant circuit, e.g., directly, in front of the compressor relative to a flow direction of the coolant and/or an actuating signal for setting a settable compressor stroke of the compressor.

The motor vehicle may have a drive unit for driving the motor vehicle and for driving the compressor as well as a drive control for controlling the drive unit as a function of the drive torque required for operating the compressor, which can be determined by the torque-determining unit. The drive unit may be, e.g., a combustion engine, an electric motor or a hybrid motor. The drive control may be, e.g., an engine control.

According to example embodiments of the present invention, a method is for operating an air-conditioning system, e.g., one having the aforementioned features, for a motor vehicle having a coolant circuit, through which it is possible to pump coolant, e.g., R134a, R152a or carbon dioxide, with the aid of a compressor, a drive torque required for operating the compressor being determined as a function of a temperature of air, which has flowed past an evaporator integrated into the coolant circuit for evaporating coolant, a pressure of the coolant prevailing in the coolant circuit, e.g., directly, in front of the compressor relative to a flow direction of the coolant and/or an actuating signal for setting a settable compressor stroke of the compressor.

The drive torque required for operating the compressor may be determined as a function of a coolant pressure prevailing in the coolant circuit behind the compressor relative to the flow direction of the coolant.

The drive torque required for operating the compressor may be determined as a function of a drive speed of the compressor.

Further features and details of exemplary embodiments of the present invention are described further below with reference to the appended Figures.

DETAILED DESCRIPTION

Figure 1:
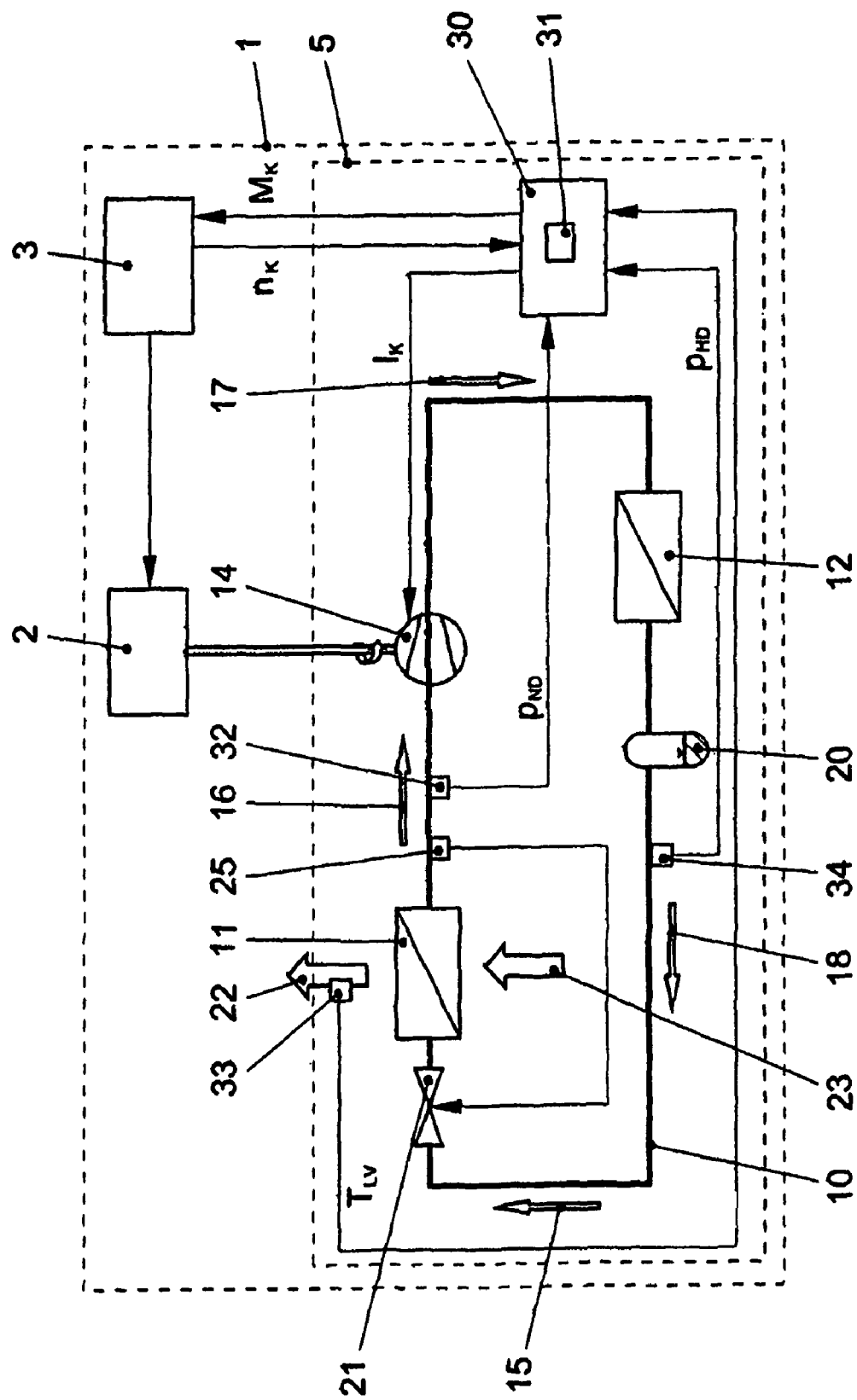
FIG. 1 is a schematic view of a motor vehicle having a combustion engine and an air-conditioning system.

FIG. 1 is a schematic view of a motor vehicle 1. Motor vehicle 1 has a combustion engine 2 and an engine control 3 for controlling combustion engine 2. Motor vehicle 1 additionally has an air-conditioning system 5.

Air-conditioning system 5 includes a coolant circuit 10, through which coolant, e.g., R134a, R152a or carbon dioxide, is pumped or is able to be pumped by a compressor 14 in a flow direction indicated by arrows 15, 16, 17, 18. Compressor 14 is driven by combustion engine 2. In this connection, a provision is made, e.g., for a speed $n_K$ of compressor 14 to be proportional to a speed of combustion engine 2. The volume flow of the coolant flowing through coolant circuit 10 is settable by setting a settable compressor stroke of compressor 14. The compressor stroke is settable as an actuating signal with the aid of compressor current $I_K$.

An evaporator 11 for evaporating coolant is integrated into coolant circuit 10. Evaporator 11 has cooling vanes, past which air 23 flows, which, after having flowed past the cooling vanes, flows out of evaporator 11 as cold air 22. In front of evaporator 11 relative to flow direction 15, 16, 17, 18 of the coolant, a thermostatic expansion valve 21 is situated, which is controlled as a function of a temperature $T_V$ of the coolant behind evaporator 11 relative to the flow direction 15, 16, 17, 18 of the coolant. For measuring temperature $T_V$ of the coolant behind evaporator 11 relative to flow direction 15, 16, 17, 18 of the coolant, a coolant temperature sensor 25 is provided.

A condenser 12 for liquefying coolant is provided in coolant circuit 10 behind compressor 14 relative to flow direction 15, 16, 17, 18 of the coolant.

In addition, a coolant collector 20 for storing coolant is provided behind condenser 12 relative to flow direction 15, 16, 17, 18 of the coolant.

Air-conditioning system 5 includes an air-conditioning system control 30 for controlling compressor 14 by outputting compressor current $I_K$. Input variables into air-conditioning system control 30 are a pressure $p_{PHD}$ of the coolant prevailing in the coolant circuit behind compressor 14, e.g., behind condenser 12 or behind coolant collector 20 (and thus in front of evaporator 14 or in front of thermostatic expansion valve 21) relative to flow direction 15, 16, 17, 18 of the coolant, which is measurable by a pressure sensor 34, drive speed $n_K$ of compressor 14, which is transmittable by engine control 3 to air-conditioning system control 30, a temperature $T_{LV}$ of cold air 22, which is measurable by a temperature sensor 33, and a pressure $p_{ND}$ of the coolant prevailing in the coolant circuit in front of compressor 14 and, e.g., behind evaporator 11 relative to flow direction 15, 16, 17, 18 of the coolant, which pressure $p_{ND}$ is measurable by a pressure sensor 32.

Figure 2:
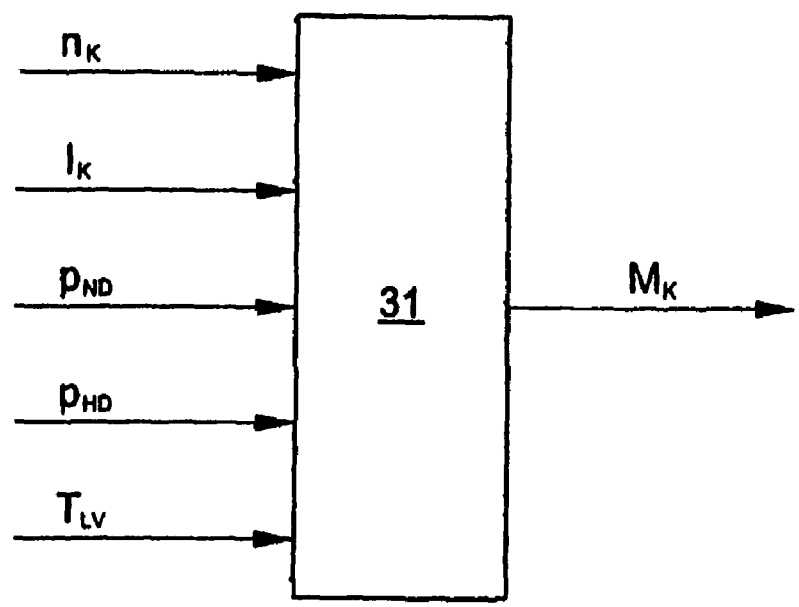
FIG. 2 illustrates a torque-determining unit for determining a drive torque required for operating a compressor.

Air-conditioning system control 30 includes a torque-determining unit 31, illustrated in FIG. 1 and FIG. 2, for determining a drive torque $M_K$ required for operating compressor 14 as a function of pressure $p_{HD}$ of the coolant prevailing in the coolant circuit behind compressor 14, e.g., behind condenser 12 or behind coolant collector 20 (and thus in front of evaporator 14 or in front of thermostatic expansion valve 21) relative to flow direction 15, 16, 17, 18 of the coolant, drive speed $n_K$ of compressor 14, temperature $T_{LV}$ of cold air 22, pressure $p_{ND}$ of the coolant prevailing in the coolant circuit in front of compressor 14 and, e.g., behind evaporator 11 relative to flow direction 15, 16, 17, 18 of the coolant and compressor current $I_K$.

Torque-determining unit 31 may include a multidimensional table or a neural network. An exemplary embodiment provides for torque-determining unit 31 to include a number of tables corresponding to Table 1, in which drive torque $M_K$ required for operating compressor 14 is entered as a function of pressure $p_{HD}$ of the coolant prevailing in the coolant circuit behind compressor 14, e.g., behind condenser 12 or behind coolant collector 20 (and thus in front of evaporator 14 or in front of thermostatic expansion valve 21) relative to flow direction 15, 16, 17, 18 of the coolant and of drive speed $n_K$ of compressor 14. If pressure $p_{HD}$ is 20 bar, for example, and drive speed $n_K$ is 1000 min$^{-1}$, then the drive torque $M_K$ required for operating the compressor is 20 Nm. In this instance, torque-determining unit 31 includes several such tables whose entries for the drive torque $M_K$ required for operating compressor 14 are a function of temperature $T_{LV}$ of cold air 22, pressure $p_{ND}$ of the coolant prevailing in the coolant circuit in front of compressor 14 and, e.g., behind evaporator 11 relative to a flow direction 15, 16, 17, 18 of the coolant and/or compressor current $I_K$.

Table 1 is an example of a table for which in relation to an exemplary embodiment:

$I_K$=0.7 A
$T_{LV}$=3° C.
$p_{ND}$=3 bar

TABLE

| | $n_K$[1/min] | | | |
|---|---|---|---|---|
| $P_{HD}$[bar] | 800 | 1000 | 1200 | ... |
| 18 | ... | ... | ... | ... |
| 20 | ... | 20 Nm | ... | ... |
| 22 | ... | ... | ... | ... |
| ... | ... | ... | ... | ... |

There may also be a provision for drive torque $M_K$ required for operating compressor 14 to be determined with the aid of torque-determining unit 31 as a function of pressure $p_{HD}$ of the coolant prevailing in the coolant circuit behind compressor 14, e.g., behind condenser 12 or behind coolant collector 20 (and thus in front of evaporator 14 or in front of thermostatic expansion valve 21) relative to flow direction 15, 16, 17, 18 of the coolant and drive speed $n_K$ of the compressor, as well as one or two of the variables temperature $T_{LV}$ of cold air 22, pressure $p_{ND}$ of the coolant prevailing in the coolant circuit in front of compressor 14 and, e.g., behind evaporator 11 relative to a flow direction 15, 16, 17, 18 of the coolant and compressor current $I_K$.

Figure 3:
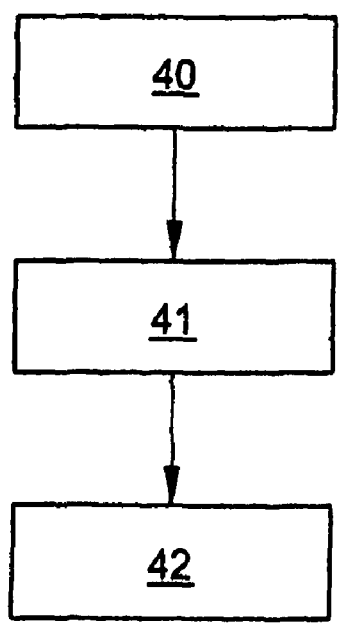
FIG. 3 illustrates a method for operating an air-conditioning system for a motor vehicle, e.g., one having the aforementioned features.

FIG. 3 illustrates a method implemented in air-conditioning system control 30 for operating air-conditioning system 5. For this purpose, in a step 40, a current value for compressor current $I_K$ is ascertained and fed to compressor 14. In another step 41, drive torque $M_K$ required for operating compressor 14 is determined with the aid of torque-determining unit 31 and is output to engine control unit 3 in a subsequent step 42.

The components in the figures are drawn with simplicity and clarity in mind and not necessarily to an exact scale. Thus, for example, the orders of magnitude of some components are exaggerated as compared to other components in order to facilitate understanding of exemplary embodiments of the present invention.

LIST OF REFERENCE CHARACTERS

| | |
|---|---|
| 1 | motor vehicle |
| 2 | combustion engine |
| 3 | engine control |
| 5 | air-conditioning system |
| 10 | coolant circuit |
| 11 | evaporator |
| 12 | condenser |
| 14 | compressor |
| 15, 16, 17, 18 | flow direction |
| 20 | coolant collector |
| 21 | thermostatic expansion valve |
| 22 | cold air |
| 23 | air |
| 25 | coolant temperature sensor |
| 30 | air-conditioning control |
| 31 | torque-determining unit |
| 32, 34 | pressure sensor |
| 33 | temperature sensor |
| 40, 41, 42 | step |
| $I_K$ | compressor current |
| $M_K$ | drive torque |
| $n_K$ | drive speed of a compressor |
| $p_{HD}, p_{ND}$ | pressure of coolant |
| $T_V$ | temperature of a coolant |
| $T_{LV}$ | temperature of cold air |

What is claimed is:

1. An air-conditioning system for a motor vehicle, comprising:
   a coolant circuit;
   a compressor configured to pump coolant through the coolant circuit;
   a torque-determination unit configured to determine a drive torque required to operate the compressor as a function of one of:
   (a) a temperature of air that has flowed past an evaporator integrated into the coolant circuit configured to evaporate the coolant and an actuation signal for setting a settable compressor stroke of the compressor;
   (b) a pressure of the coolant prevailing in the coolant circuit in front of the compressor relative to a flow direction of the coolant and the actuation signal; and
   (c) the temperature of air that has flowed past the evaporator, the pressure of the coolant prevailing in the coolant circuit in front of the compressor relative to the flow direction of the coolant, and the actuation signal.

2. The air-conditioning system according to claim 1, wherein the coolant includes at least one of (a) R134a and (b) R152a.

3. The air-conditioning system according to claim 1, wherein the coolant includes carbon dioxide.

4. The air-conditioning system according to claim 1, wherein the torque-determination unit is configured to determine the drive torque required to operate the compressor as a function of the pressure of the coolant prevailing in the coolant circuit behind the compressor relative to the flow direction of the coolant.

5. The air-conditioning system according to claim 1, wherein the torque-determination unit is configured to determine the drive torque required to operate the compressor as a function of a drive speed of the compressor.

6. The air-conditioning system according to claim 1, wherein the air-conditioning system forms a part of the motor vehicle.

7. The air-conditioning system according to claim 6, further comprising:
   a drive unit configured to drive the motor vehicle and to drive the compressor; and
   a drive control device configured to control the drive unit as a function of the drive torque required to operate the compressor.

8. A method for operating an air-conditioning system for a motor vehicle having a coolant circuit and a compressor configured to pump coolant through the coolant circuit, comprising:
   determining a drive torque required to operate the compressor as a function of one of:
   (a) a temperature of air that has flowed past an evaporator integrated into the coolant circuit configured to evaporate the coolant and an actuation signal for setting a settable compressor stroke of the compressor;
   (b) a pressure of the coolant prevailing in the coolant circuit in front of the compressor relative to a flow direction of the coolant and the actuation signal; and
   (c) the temperature of air that has flowed past the evaporator, the pressure of the coolant prevailing in the coolant circuit in front of the compressor relative to the flow direction of the coolant, and the actuation signal.

9. The method according to claim 8, wherein the drive torque is determined in the drive-torque determining step as a function of a pressure of the coolant prevailing in the coolant circuit behind the compressor relative to the flow direction of the coolant.

10. The method according to claim 9, wherein the drive torque is determined in the drive-torque determining step as a function of a drive speed of the compressor.

* * * * *